April 29, 1952 — E. E. McCOY — 2,594,473
DRIP-CATCHING SPOON RACK
Filed Aug. 10, 1949
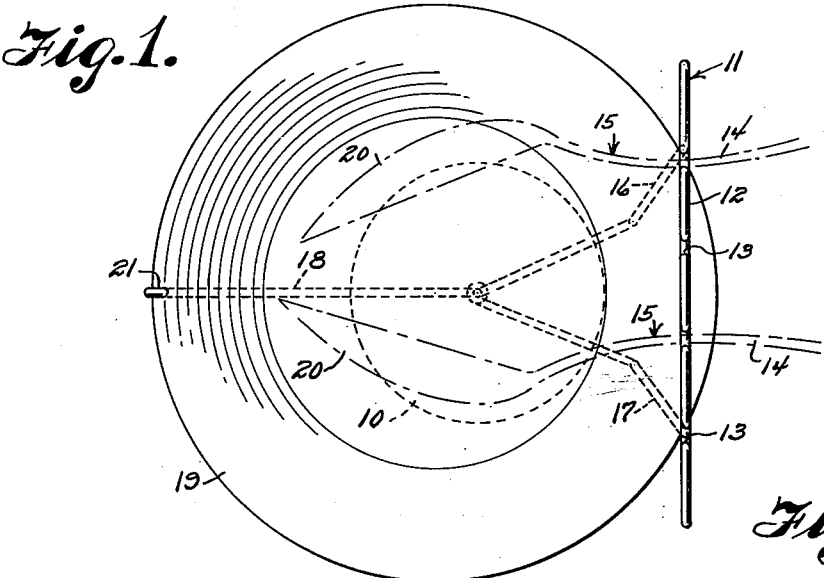
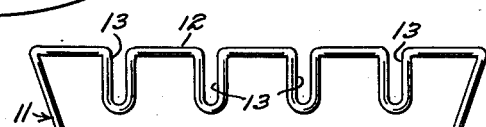
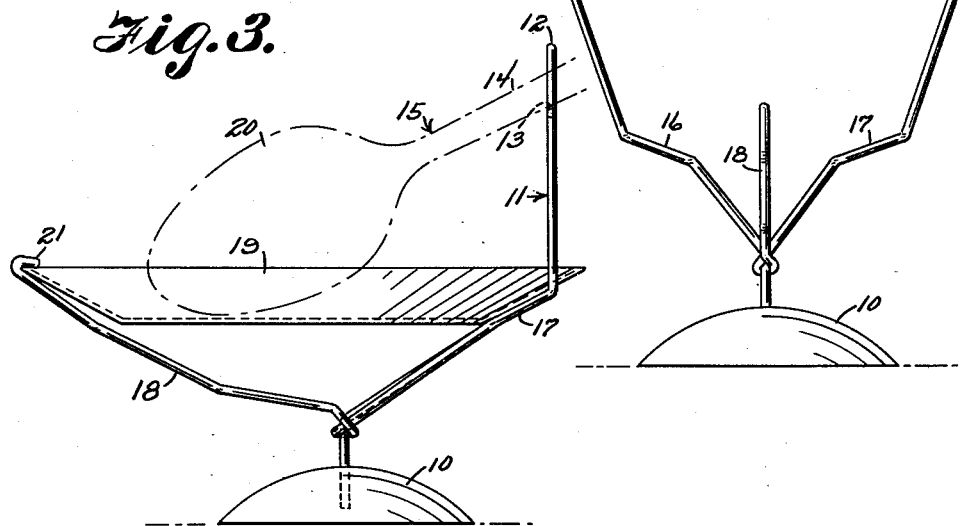
INVENTOR.
Ernest E. McCoy
BY Victor J. Evans & Co.
ATTORNEYS

Patented Apr. 29, 1952

2,594,473

UNITED STATES PATENT OFFICE 2,594,473

DRIP-CATCHING SPOON RACK

Ernest E. McCoy, Grand Lake, Colo.

Application August 10, 1949, Serial No. 109,532

1 Claim. (Cl. 65—65)

This invention relates to a rack, and more particularly to a rack for supporting kitchen utensils, such as spoons.

The object of the invention is to provide a rack for supporting spoons, the rack having a pan for receiving drippings from the spoon so that these drippings will not fall onto and soil stoves or other articles of kitchen equipment.

Another object of the invention is to provide a spoon rack for supporting a plurality of spoons thereon, the rack being constructed so that the spoons are maintained separated from each other, whereby intermixing of the foodstuffs on individual spoons is prevented.

A further object of the invention is to provide a spoon rack which is attractive and simple and inexpensive to manufacture.

Other objects and advantages will be apparent in the course of the following description.

In the accompanying drawings forming a part of this application, and in which like numerals are used to designate like parts throughout the same:

Figure 1 is a top plan view of the spoon rack according to the present in invention;

Figure 2 is a front elevational view of the rack;

Figure 3 is a side elevational view of the spoon rack.

Referring in detail to the drawings, there is shown a spoon rack which includes a base 10 that is preferably fabricated of a non-inflammable material. Projecting upwardly from the base 10 and secured thereto is a body member 11 which is provided with an upper horizontally-disposed portion 12. The horizontally-disposed portion 12 is shaped to define a plurality of recesses or notches 13 which are adapted to receive and support therein the handles 14 of spoons 15.

The body member 11 is also shaped to define a pair of inclined portions 16 and 17 which define shoulders for a purpose to be later described. Projecting from the body member 11 is a support member 18, and the support member 18 coacts with the shoulders 16 and 17 to provide a support for a pan 19 which serves to collect drippings from the bowls 20 of the spoons 15. The support member 18 terminates in a hook 21 which is adapted to engage the upper edge of the pan 19 to prevent accidental movement of the pan 19 off of the rack.

From the foregoing, it is apparent that a device has been provided which is especially suitable for supporting spoons containing drippings or foodstuffs thereon. Thus, the spoons 15 can be arranged as shown in Figures 1 and 3, the rack being constructed so that a plurality of the spoons 15 can be supported without having any intermixing of the drippings or foodstuffs on the bowls 20 of the spoons. Further, any drippings that leave the bowls of the spoons 15 will be caught or collected in the pan 19, whereby soiling or contamination of the kitchen stove or other article of kitchen equipment will be prevented. The rack is so constructed that the spoons 15 can be readily removed from or inserted in the rack as desired.

By using the device of the present invention, the spoons after having been used need not be positioned on the stove, and this is advantageous because when used spoons are placed on a stove, the drippings from the spoons collect, dry and present a difficult cleaning problem. The major portion of the spoon-supporting device can be fabricated from any suitable material, such as a single length of wire, or from a suitable plastic. The spoon handles 14 rest in the recesses 13 while the bowls 20 are supported on the bottom of the pan 19. The pan 19 is preferably made of metal or other non-breakable and non-combustible material. The base 10 serves to support the device and provide an anchor whereby the supporting device will not accidentally topple over. A suitable attractive finish, such as chrome or enamel, may be applied to the spoon-supporting device in order to enhance the appearance thereof. The device of the present invention will eliminate the necessity of leaving spoons in cooking pots, and this is advantageous because when spoons are left in such pots, the spoons become too hot to be grasped in the user's hands.

I claim:

As a new article of manufacture, a rack for supporting spoons comprising a base fabricated of a non-inflammable material, a body member projecting upwardly from said base and secured thereto, said body member being provided with a plurality of recesses for receiving and supporting individual spoons therein, said body member being provided with a pair of inclined portions defining shoulders, an inclined support member projecting laterally from said body member and coacting with said shoulders to support thereon a pan in elevated relation to said base, said pan serving to collect drippings from said spoons, and said support member terminating in a hook for preventing accidental movement of said pan.

ERNEST E. McCOY.

(References on following page)

REFERENCES CITED

The following references are of record in the file of this patent:

UNITED STATES PATENTS

| Number | Name | Date |
|---|---|---|
| 83,538 | Patten | Oct. 27, 1868 |
| 517,293 | Powell | Mar. 27, 1894 |
| 526,079 | Hunter | Sept. 18, 1894 |
| 720,972 | Schaeffer | Feb. 17, 1903 |
| 1,204,442 | Hood | Nov. 14, 1916 |
| 1,225,870 | Schwing | May 15, 1917 |
| 1,344,802 | Lackner | June 29, 1920 |
| 1,611,231 | Ratterman | Dec. 21, 1926 |
| 1,717,556 | Haese | June 18, 1929 |
| 1,769,324 | Simmons | July 1, 1930 |
| 1,886,075 | Zorsch | Nov. 1, 1932 |
| 2,110,542 | Allen | Mar. 8, 1938 |
| 2,174,093 | Perlman | Sept. 26, 1939 |
| 2,237,361 | Poynter | Apr. 8, 1941 |
| 2,411,864 | Birkin | Dec. 3, 1946 |

FOREIGN PATENTS

| Number | Country | Date |
|---|---|---|
| 146,816 | Switzerland | July 16, 1931 |
| 429,554 | France | July 21, 1911 |